United States Patent [19]

Utting et al.

[11] 4,311,909

[45] Jan. 19, 1982

[54] GEIGER-MUELLER TUBE COINCIDENCE LOSS CORRECTION CIRCUIT

[75] Inventors: George R. Utting, Satellite Beach; Scott M. Graham, Titusville, both of Fla.

[73] Assignee: Victoreen Incorporated, Cleveland, Ohio

[21] Appl. No.: 171,366

[22] Filed: Jul. 23, 1980

[51] Int. Cl.³ .............................. G01T 1/18; H01J 47/02
[52] U.S. Cl. ...................................... 250/374; 250/388
[58] Field of Search .................... 250/374, 375, 388; 315/84.5; 328/127, 128, 129

[56] References Cited

U.S. PATENT DOCUMENTS

| | | | |
|---|---|---|---|
| 3,366,791 | 1/1968 | Markow | 250/388 |
| 3,814,937 | 6/1974 | Lowes | |
| 3,959,653 | 5/1976 | Lee et al. | 250/374 |
| 3,984,690 | 10/1976 | Marshall et al. | 250/374 |
| 4,090,082 | 5/1978 | Marshall | |

Primary Examiner—Alfred E. Smith
Assistant Examiner—Janice A. Howell
Attorney, Agent, or Firm—Harness, Dickey & Pierce

[57] ABSTRACT

A Geiger-Mueller (GM) tube coincidence loss correction circuit for automatically compensating for the dead time of the GM tube in an analog system so that the reading provided by the meter more accurately reflects the true radiation level. The electrical output pulses from the GM tube are differentiated and provided to a retriggerable one-shot multivibrator circuit which produces in response to each GM tube pulse a corresponding output pulse of predetermined duration greater than the dead time of the Geiger tube. The output pulse signal from the multivibrator circuit advances an analog ratemeter circuit and also effectively disables "time" for the duration of the output pulse by opening an analog switch connected in the discharge path of the integrating capacitor in the ratemeter circuit to maintain constant the charge thereon.

5 Claims, 1 Drawing Figure

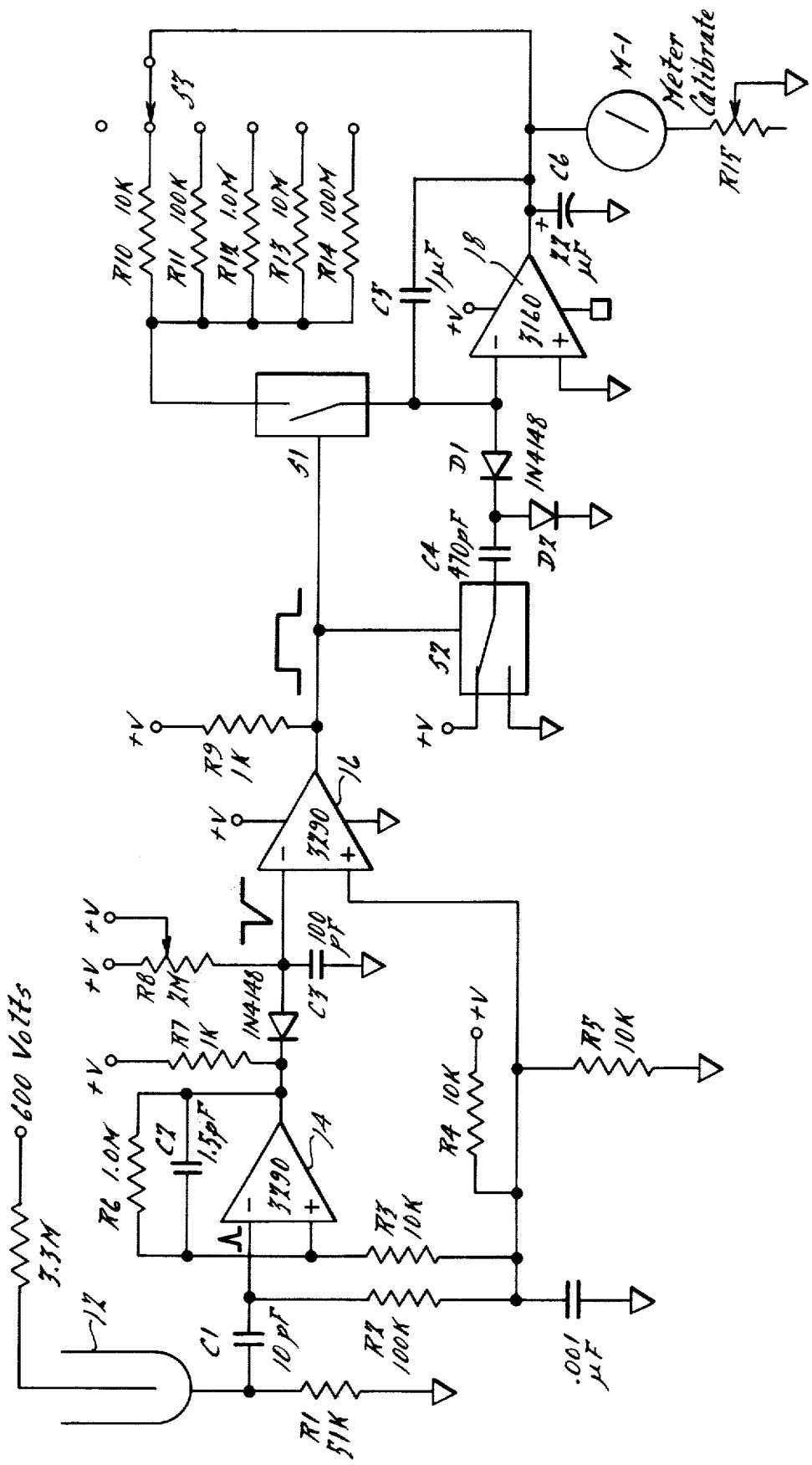

GEIGER-MUELLER TUBE COINCIDENCE LOSS CORRECTION CIRCUIT

BACKGROUND AND SUMMARY OF THE INVENTION

The present invention relates to radiation measuring devices and in particular to an analog ratemeter circuit for use in conjunction with a Geiger-Mueller tube for detecting and measuring ionizing radiation levels.

A common method used to detect and measure ionizing radiation involves the use of a Geiger-Mueller (GM) tube which is adapted to produce electrical pulses at a rate that is proportional to the amount of radiation present. Geiger-Mueller tubes are characterized, however, by a dead time period which follows the production of each pulse, during which period the GM tube is unable to produce another pulse. The dead time characteristic of a GM tube therefore effects the accuracy of the measurement in high intensity radiation fields.

To improve the high field accuracy of their radiation detectors, most manufacturers have either reduced the sensitivity of the GM tube, which adversely effects low field response, or have resorted to the use of two separate GM tubes, a low sensitivity tube for high fields and a high sensitivity tube for low fields. In addition, various circuits have been proposed for compensating for the dead time of a GM tube. However, these circuits have generally proven to be quite complex and not readily compatible with the analog-type ratemeters most widely used today in survey instruments.

Accordingly, it is the primary object of the present invention to provide a coincidence loss correction circuit which compensates for GM tube dead time and is compatible with analog ratemeter circuits.

In addition, it is an object of the present invention to provide such an analog coincidence loss correction circuit which substantially increases the high field accuracy of the radiation measuring device and yet is relatively simple in design and inexpensive to manufacture.

In general, the coincidence loss correction circuit according to the present invention initially differentiates the electrical output pulses from the GM tube and then provides the signal to a retriggerable one-shot multivibrator circuit. In response to the receipt of a pulse from the GM tube, the multivibrator circuit is adapted to produce a square wave output pulse having a preset duration greater than the dead time of the GM tube. If a GM pulse occurs after the dead time of the Geiger tube but before the termination of the output pulse from the multivibrator circuit, the multivibrator circuit will be retriggered to extend the output pulse for an additional fixed duration.

The output from the multivibrator circuit is provided to the input of a modified charge pump ratemeter circuit which includes a charge circuit for producing an input current proportional to the pulse rate of the output from the multivibrator circuit which flows through one of a plurality of range resistors to thereby produce a corresponding output voltage that is read by an analog meter. In addition, the pulse output signal from the multivibrator circuit is also utilized to control the conductive state of an analog switch connected between an integrating capacitor and the range resistors to control the discharge of the capacitor. As will be seen, this effectively serves to disable the "time" measurement in the ratemeter circuit during those intervals when GM pulses are not being counted so that the meter provides a true measurement of the Geiger tube pulse rate compensated for tube dead time.

Additional objects and advantages of the present invention will become apparent from a reading of the detailed description of the preferred embodiment which makes reference to the following drawing:

DETAILED DESCRIPTION OF THE DRAWING

The FIGURE is a circuit diagram of a concidence loss correction circuit according to the present invention.

DETAILED DESCRIPTION OF THE PREFERRED EMBODIMENT

Referring to the drawing, a Geiger-Mueller (GM) tube coincidence loss correction circuit according to the present invention is shown. The Geiger tube 12 is connected to a high voltage source and is adapted to produce electrical output pulses at a rate determined by the amount of radiation present. The train of output pulses from the Geiger tube 12 is differentiated by capacitor C1 and resistors R1 and R2 and then provided to a retriggerable one-shot multivibrator circuit comprised principally of comparator amplifiers 14 and 16. In particular, the differentiated pulse signal from the output of Geiger tube 12 is provided to the negative input of comparator amplifier 14. The positive input of amplifier 14 is connected to a voltage divider network comprised of resistors R4 and R5. Comparator amplifier 14, therefore, serves as an amplitude discriminator by passing only those Geiger tube output pulses having an amplitude greater than the preset differential between the positive and negative inputs of amplifier 14, which may for example be set to 100 millivolts. When the amplitude of a differentiated Geiger tube pulse exceeds the reference signal, comparator amplifier 14 will produce a LO output signal which is in turn provided to the negative input of comparator amplifier 16. The negative input of comparator amplifier 16 is also connected to the midpoint of an RC timing network comprised of potentiometer R8 and capacitor C3. The positive input of comparator 16 is connected to the midpoint of the voltage divider network comprised of resistors R4 and R5. Thus, when a LO pulse is produced at the output of comparator amplifier 14, the magnitude of the signal at the negative input of comparator 16 will be less than that of the reference signal provided to the positive input of comparator 16, thereby causing the output of comparator amplifier 16 to go HI. Subsequently, the output of comparator amplifier 14 will return to a HI state and capacitor C3 will begin to charge at a rate determined by the setting of potentiometer R8 until it attains a potential which exceeds the reference signal supplied to the positive input of comparator 16. When this occurs, the output of comparator amplifier 16 will again go LO. Thus, it will be appreciated that the setting of potentiometer R8 determines the duration of the square wave pulse produced at the output of comparator amplifier 16. In the preferred embodiment potentiometer R8 is set so that the duration of the output pulse from comparator amplifier 16 is greater than the dead time of the Geiger tube 12.

It will be noted at this point that if a Geiger tube pulse is produced after the dead time of the Geiger tube 12 but before the termination of the output pulse from comparator amplifier 16, the multivibrator circuit will effectively be retriggered and an extended HI state of equal duration will be produced at the output of comparator 16. In particular, the occurrence of an additional Geiger tube pulse during this interval will cause the output of comparator amplifier 14 to again go LO, thereby immediately discharging capacitor C3 and resetting the RC timing network. Accordingly, capacitor C3 must charge from its fully discharged state to a potential greater than the reference signal supplied to the positive input of comparator 16 before the HI output pulse from comparator 16 is terminated.

The square wave output pulse from the multivibrator circuit at the output of comparator 16 is provided to the control terminal of an analog switch S2. When the output from comparator 16 is HI, analog switch S2 is in the conductive state illustrated, connecting capacitor C4 directly to a +V source. Capacitor C4 will therefore rapidly charge through diode D2 to essentially a voltage of +V, thereby producing a charge (Q) on capacitor C4 equal to the product of (C4)(V). When the HI output pulse from comparator 16 is terminated and analog switch S2 changes state, capacitor C4 will discharge through diode D1 into capacitor C5 and the negative input of operational amplifier 18. The value of this charge current (I) is equal to the charge (Q) on capacitor C4 times the pulse repetition rate (N). When analog switch S1 is closed, this current (I) will flow through one of the range resistors R10-R14, depending upon the position of range switch S3, thereby producing a voltage which is read by meter M-1. The meter M-1 is calibrated by potentiometer R15. Thus, the voltage read by meter M-1, which essentially corresponds to the voltage at the output of amplifier 18, is equal to (C4)(V)(N)(R10).

Significantly, it will be noted, that the output pulse signal from comparator amplifier 16 also controls the conductive state of analog switch S1. In particular, when the output from comparator amplifier 16 is HI, analog switch S1 is open as illustrated, thereby preventing the flow of current through range resistors R10-R14 and hence the discharge of capacitor C5. In other words, when capacitor C4 is being charged to +V through analog switch S2, the charge on capacitor C5 is being maintained constant by the open state of analog switch S1. Thus, it will be appreciated that during the designated dead time period when the output of comparator amplifier 16 is HI and no Geiger tube pulses are being counted, the charge on capacitor C5 is held constant, thereby effectively halting "time" with respect to the ratemeter M-1. Accordingly, ratemeter M-1 will provide a reading corresponding to the true pulse output rate of the Geiger tube 12, automatically compensated for the dead time of the tube.

Finally, it should be noted that analog switch S2 may alternatively be eliminated and the output of comparator amplifier 16 connected directly to capacitor C4. Analog switch S2 is utilized in the preferred embodiment because it is available on the same package as analog switch S1 and its presence improves somewhat the voltage stability of the input pulse provided to capacitor C4.

While the above description constitutes the preferred embodiment of the present invention, it will be appreciated that the invention is susceptible to modification, variation and change without departing from the proper scope or fair meansing of the accompanying claims.

What is claimed is:

1. An analog ratemeter circuit for measuring the radiation level detected by a Geiger-Mueller (GM) tube which is characterized by a dead time following the production of each electrical output pulse during which time the GM tube is unable to produce another output pulse, comprising:

first circuit means responsive to the electrical output pulses produced by said GM tube for producing a first output pulse whenever the amplitude of a GM tube pulse exceeds a predetermined level;

second circuit means responsive to said first output pulse for producing a second output pulse having a predetermined duration greater than the dead time of said GM tube;

analog rate circuit means responsive to said second output pulse signal for producing an analog output signal proportional to the pulse rate of said second output pulse signal;

an analog meter responsive to said analog output signal for providing a reading proportional to said analog output signal; and electronic switch means connected in circuit with said analog rate circuit means and responsive to said second output pulse signal for maintaining substantially constant the magnitude of said analog output signal during said predetermined duration of said second output pulse.

2. The analog ratemeter circuit of claim 1 wherein said second circuit means if further adapted to produce an extended output pulse of said predetermined duration whenever a second of said first output pulses is produced after the dead time of said GM tube but before the termination of the first of said second output pulses.

3. The analog ratemeter circuit of claim 1 wherein said analog rate circuit means includes a capacitor that is charged in accordance with the pulse rate of said second output pulse signal and a resistor connected in parallel with said capacitor for controlling the rate of discharge of said capacitor.

4. The analog ratemeter circuit of claim 3 wherein said electronic switch means is connected in series with said resistor for opening the discharge path of said capacitor whenever one of said second output pulses is produced.

5. The analog ratemeter circuit of claim 4 wherein said electronic switch means comprises an analog switch having its control terminal connected to said second circuit means so that the conductive state of said analog switch is controlled by said second output pulse signal.

* * * * *